US010525851B2

(12) United States Patent
Huang et al.

(10) Patent No.: US 10,525,851 B2
(45) Date of Patent: Jan. 7, 2020

(54) SEATBACK-SEAT LINKAGE MECHANISM

(71) Applicant: Aerospace Industrial Development Corp., Taichung (TW)

(72) Inventors: Chung-Li Huang, Taichung (TW); Chi-Heng Lai, Taichung (TW); Jinn-Biau Sheu, Taichung (TW)

(73) Assignee: AEROSPACE INDUSTRIAL DEVELOPMENT CORP., Taichung (TW)

( * ) Notice: Subject to any disclaimer, the term of this patent is extended or adjusted under 35 U.S.C. 154(b) by 0 days.

(21) Appl. No.: 16/003,040

(22) Filed: Jun. 7, 2018

(65) Prior Publication Data

US 2019/0291610 A1 Sep. 26, 2019

(30) Foreign Application Priority Data

Mar. 22, 2018 (TW) .............................. 107109911 A

(51) Int. Cl.
| | |
|---|---|
| *B60N 2/12* | (2006.01) |
| *B60N 2/20* | (2006.01) |
| *B60N 2/22* | (2006.01) |
| *B60N 2/68* | (2006.01) |
| *B60N 2/10* | (2006.01) |

(52) U.S. Cl.
CPC ............. *B60N 2/2209* (2013.01); *B60N 2/10* (2013.01); *B60N 2/68* (2013.01)

(58) Field of Classification Search
CPC ........... B60N 2/2209; B60N 2/10; B60N 2/68
USPC ................................ 297/317, 322, 341, 342
See application file for complete search history.

(56) References Cited

U.S. PATENT DOCUMENTS

| | | | | |
|---|---|---|---|---|
| 5,509,722 A * | 4/1996 | Beroth | ............... | B64D 11/0693 244/118.6 |
| 6,494,536 B2 * | 12/2002 | Plant | .................... | A47C 1/0352 297/342 X |
| 6,641,214 B2 * | 11/2003 | Veneruso | ............. | B60N 2/0232 297/317 X |
| 6,742,840 B2 * | 6/2004 | Bentley | .................... | B60N 2/22 297/317 X |
| 8,272,694 B2 * | 9/2012 | Hawkins | ................ | B60N 2/181 297/317 |
| 8,439,435 B2 * | 5/2013 | Gaither | .................. | B60N 2/242 297/317 X |
| 8,616,631 B2 * | 12/2013 | Westerink | ................ | B60N 2/24 297/188.08 |

(Continued)

*Primary Examiner* — Rodney B White
(74) *Attorney, Agent, or Firm* — Bruce Stone LLP; Joseph A. Bruce

(57) ABSTRACT

A seatback-seat linkage mechanism includes two connecting rod assemblies and a seat. The connecting rod assemblies are connected between the seat and the seatback. The seat is mounted on the seat pipes and includes two seat supports, two rear pin support assemblies and two front pin support assemblies. Each of seat supports is provided with a first slide slot and a second slide slot. The rear and front pin support assemblies are mounted on the seat pipes in such a manner that the first pin portion of each of the rear pin support assemblies is inserted in the first slide slot, the second pin portion of each of the front pin assemblies is inserted in the second slide slot, so that, when the connecting rod assemblies drive the seat to move, the seat is able to reciprocate stably along the extending directions of the first and second slide slots.

10 Claims, 7 Drawing Sheets

(56) References Cited

U.S. PATENT DOCUMENTS

| | | | | |
|---|---|---|---|---|
| 8,733,840 B2* | 5/2014 | Westerink | ............ | B60N 2/1625 |
| | | | | 297/317 X |
| 8,827,365 B2* | 9/2014 | Gaither | ................. | B60N 2/242 |
| | | | | 297/342 |
| 9,771,155 B2* | 9/2017 | Zheng | ................ | B64D 11/0619 |
| 9,994,321 B2* | 6/2018 | Murnan | ................ | B64D 11/06 |
| 10,207,808 B2* | 2/2019 | Zheng | ................ | B64D 11/064 |

* cited by examiner

SEATBACK-SEAT LINKAGE MECHANISM

BACKGROUND

Field of the Invention

The present invention relates to a seat mechanism, and more particularly to a seatback-seat linkage mechanism.

Related Prior Art

Most vehicle seats are designed in such a way that the angle of the seatback is adjustable, and in particular, there is a design that can adjust the seatback and the seat simultaneously. In the process of tilting the seatback, the seat will have a corresponding amount of displacement. The conventional seatback-seat linkage mechanism has various designs, and one of them is as shown in FIG. 1 and includes a first seatback unit 61, a first fixed seat 62, a first movable seat 63 and a first connecting rod assembly 64.

The first seatback unit 61 is connected to one end of the first fixed seat 62. The first connecting rod assembly 64 has two ends pivotally connected to the first seatback unit 61 and the first fixed seat 62, respectively. A pivot point 641 is disposed between the two ends of the first connecting rod assembly 64 to connect one end of the first movable seat 63. Therefore, when the user controls the first seatback unit 61 to tilt backward, the first movable seat 63 can be moved backward through the pivot point 641 of the first connecting rod assembly 64. In addition, another end of the first fixed seat 62 opposite to the end connected to the first seatback unit 61 is provided with a first seat pipe 621, and the first movable seat 63 has an engaging slot 631 formed at a lateral edge facing the first seat pipe 621. The first movable seat 63 moves until the first seat pipe 621 is engaged in the engaging slot 631.

Another design of the conventional seatback-seat linkage mechanism is as shown in FIG. 2, which includes: a second movable seat 71, a second connecting rod assembly 72 and two second seat pipes 73.

The second connecting rod assembly 72 has two ends pivotally connected to a second seatback unit 74 and the second movable seat 71, respectively. The second movable seat 71 is mounted on the second seat pipes 73, and has a side surface facing the second seat pipes 73 provided with two engaging protrusions 71A. Two sides of each of the engaging protrusions 71A are connected with an arc-shaped surface 71B, respectively. When the user controls the second seatback unit 74 to title backward, the second connecting rod assembly 72 will drivingly move the second movable seat 71, so that the second movable seat 71 will approach one end of the second seatback unit 74 while moving down along the curves of the arc-shaped surfaces 71B, so as to achieve the function of linkage mechanism.

Yet another design of the conventional seatback-seat linkage mechanism is as shown in FIG. 3, which includes: a third seatback unit 81, a third movable seat 82, a seat 83 and a plurality of bolts 84. The third movable seat 82 is provided with a plurality of slots 821. Each of the third seatback unit 81 and the third movable seat 82 is provided with two bolts 84 which are movably disposed in the respective slots 821. When the third seatback unit 81 tilts backward, it will move the third movable seat 82 via a third connecting rod assembly 85, so that the third movable seat 82 will be guided by the slots 821 to move backward and downward.

From the foregoing description, it can be known that the seatback-seat linkage mechanisms are often and mostly used in combination with the radian or the curves of the seat only, and its reliability and stability are slightly insufficient. In addition, although conventional seatback-seat linkage mechanism as shown in FIG. 3 is provided with the slots 821 and the bolts 84, the bolts 84 are disposed on and pivotally connected to the third seatback unit 81 and the third movable seat 82 by a plurality of sheet members. These conventional seatback-seat linkage mechanisms not only have a less stable structure, but also are vulnerable to damage.

The present invention has arisen to mitigate and/or obviate the afore-described disadvantages.

SUMMARY

One objective of the present invention is to provide a structurally stable seatback-seat linkage mechanism.

Another objective of the present invention is to provide an ergonomic seatback-seat linkage mechanism.

To achieve the above objectives, a seatback-seat linkage mechanism provided by the invention is used in combination with a seatback and arranged on a plurality of seat pipes, the seatback-seat linkage mechanism compres:

a plurality of connecting rod assemblies connected to the seatback;

a seat movably disposed on the two seat pipes, wherein the connecting rod assemblies are connected to the seat, the seat includes two seat supports, two rear pin support assemblies and two front pin support assemblies, each of the seat supports includes a first end and a second end, each of the seat supports is provided with a first slide slot and a second slide slot which is located closer to the second end than the first slide slot, and the first slide slot is located closer to the first end than the second slide slot;

each of the two rear pin support assemblies is disposed on one side of a corresponding one of the two seat supports, located adjacent to the first slide slot of the corresponding one of the two seat supports, and includes a first groove portion and a first pin portion, the first groove portions are provided for engaging with the seat pipes, the first pin portions are inserted into the first slide slots;

each of the two front pin support assemblies is disposed on the one side of the corresponding one of the two seat supports, located adjacent to the second slide slot of the corresponding one of the two seat supports, and includes a second groove portion and a second pin portion, the second groove portions are provided for engaging with the seat pipes, and the second pin portions are inserted into the second slide slots.

It can be seen from the above description that the seatback-seat linkage mechanism of the invention is essentially provided with the two seat supports, each of which is provided with the first slide slot and the second slide slot. The rear and front pin support assemblies are stably mounted on the seat pipes in such a manner that the first pin portion of each of the rear pin support assemblies is inserted in the first slide slot, the second pin portion of each of the front pin assemblies is inserted in the second slide slot, so that, when the connecting rod assemblies drive the seat to move, the seat is able to reciprocate stably along the extending directions of the first and second slide slots, thus achieving the purpose of providing a structurally stable seatback-seat linkage mechanism.

Preferably, each of the seat supports includes a top surface and a bottom surface, a direction extending from the top surface to the bottom surface is defined as a height direction, the first slide slot includes a first slot end and a second slot end which are located in different positions along the height direction, and the first slot end is located closer to the seat pipes than the second slot end in the height direction.

In this way, when the seat is moved, it also has an amount of displacement in the height direction, so as to meet ergonomic requirements.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
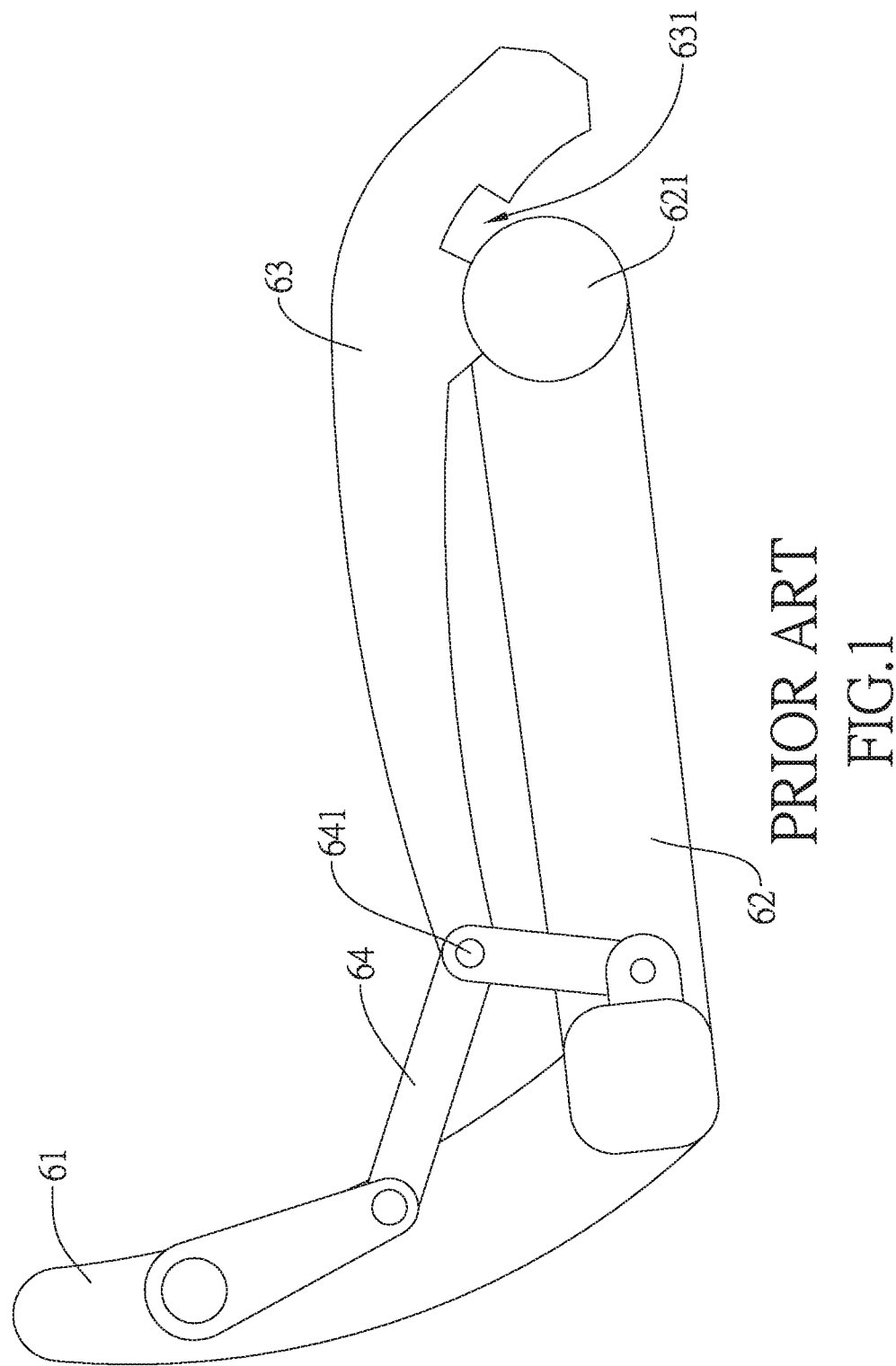
FIG. 1 is an illustrative view of a conventional seatback-seat linkage mechanism.
Figure 2:
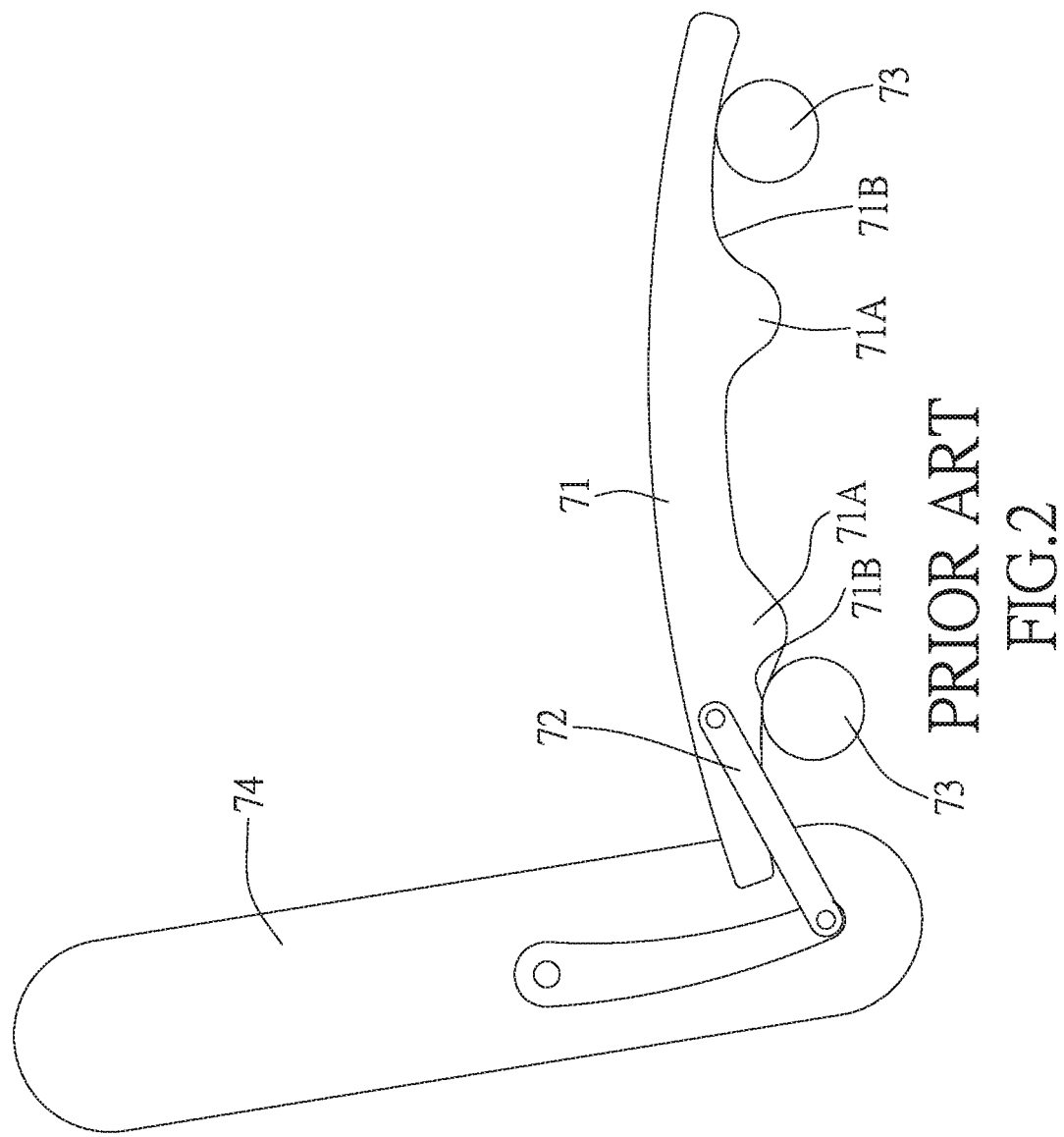
FIG. 2 is an illustrative view of a conventional seatback-seat linkage mechanism.
Figure 3:
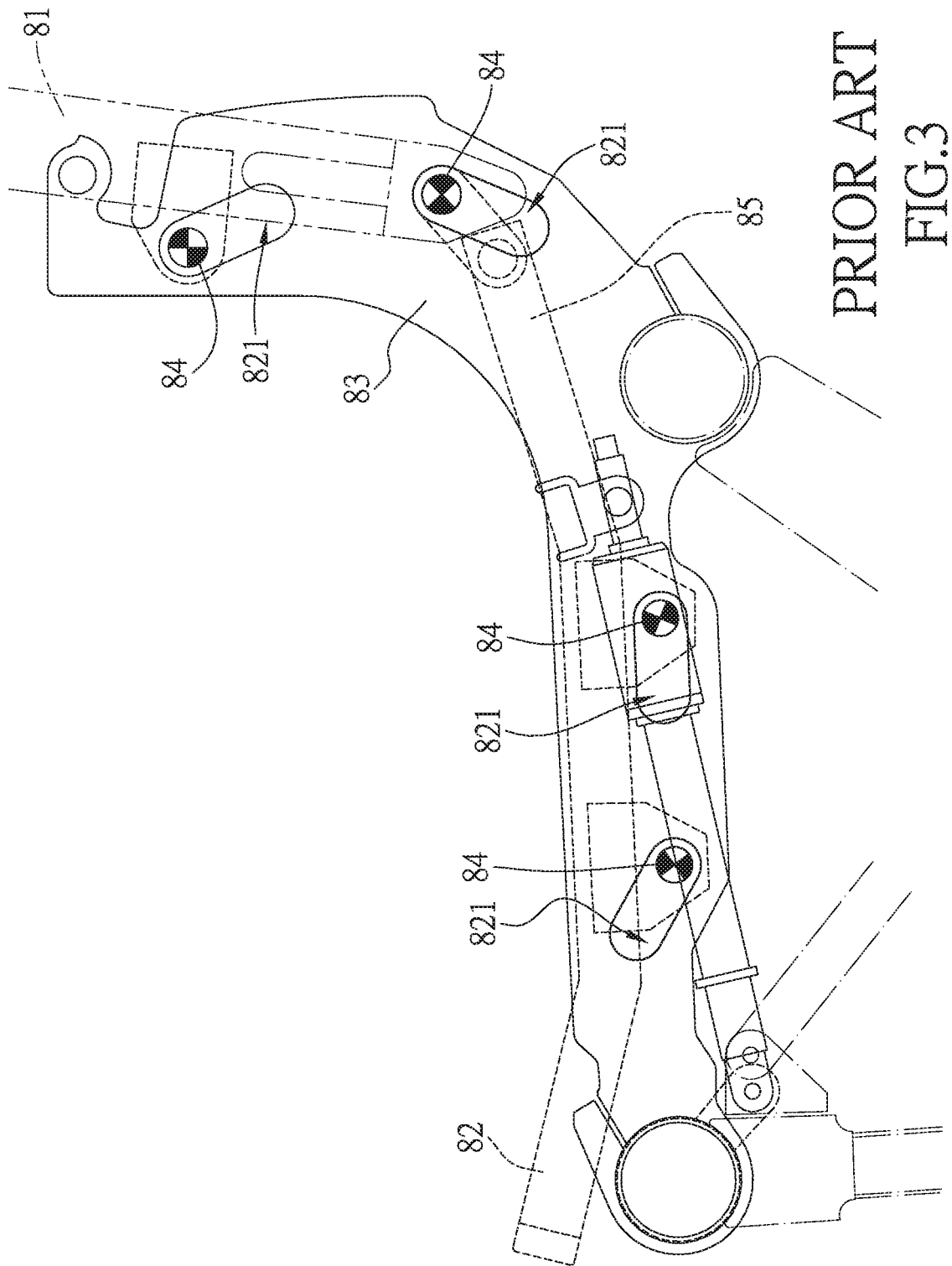
FIG. 3 is an illustrative view of a conventional seatback-seat linkage mechanism.
Figure 4:
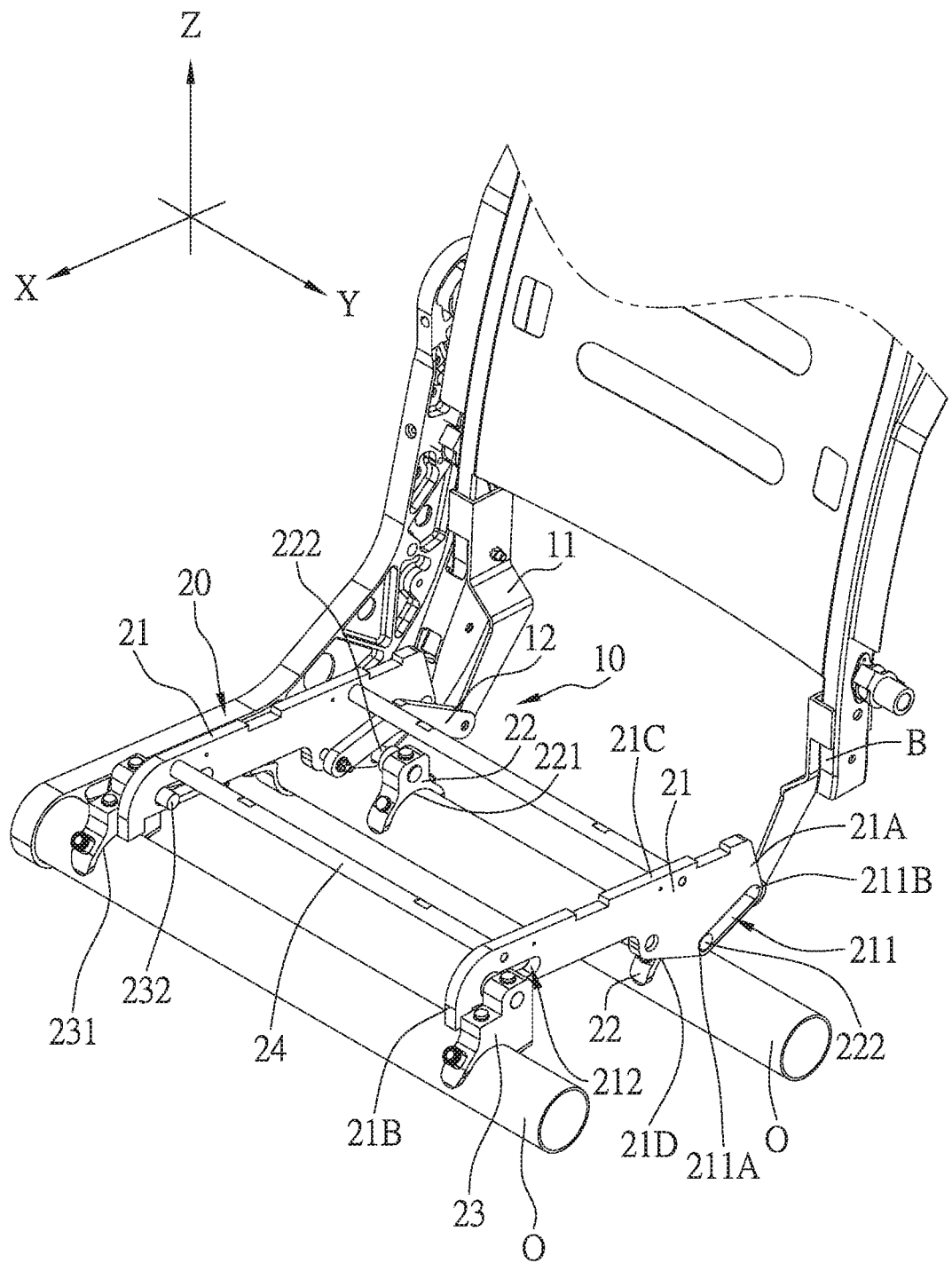
FIG. 4 is a perspective view of the seatback-seat linkage mechanism in accordance with the present invention.
Figure 5:
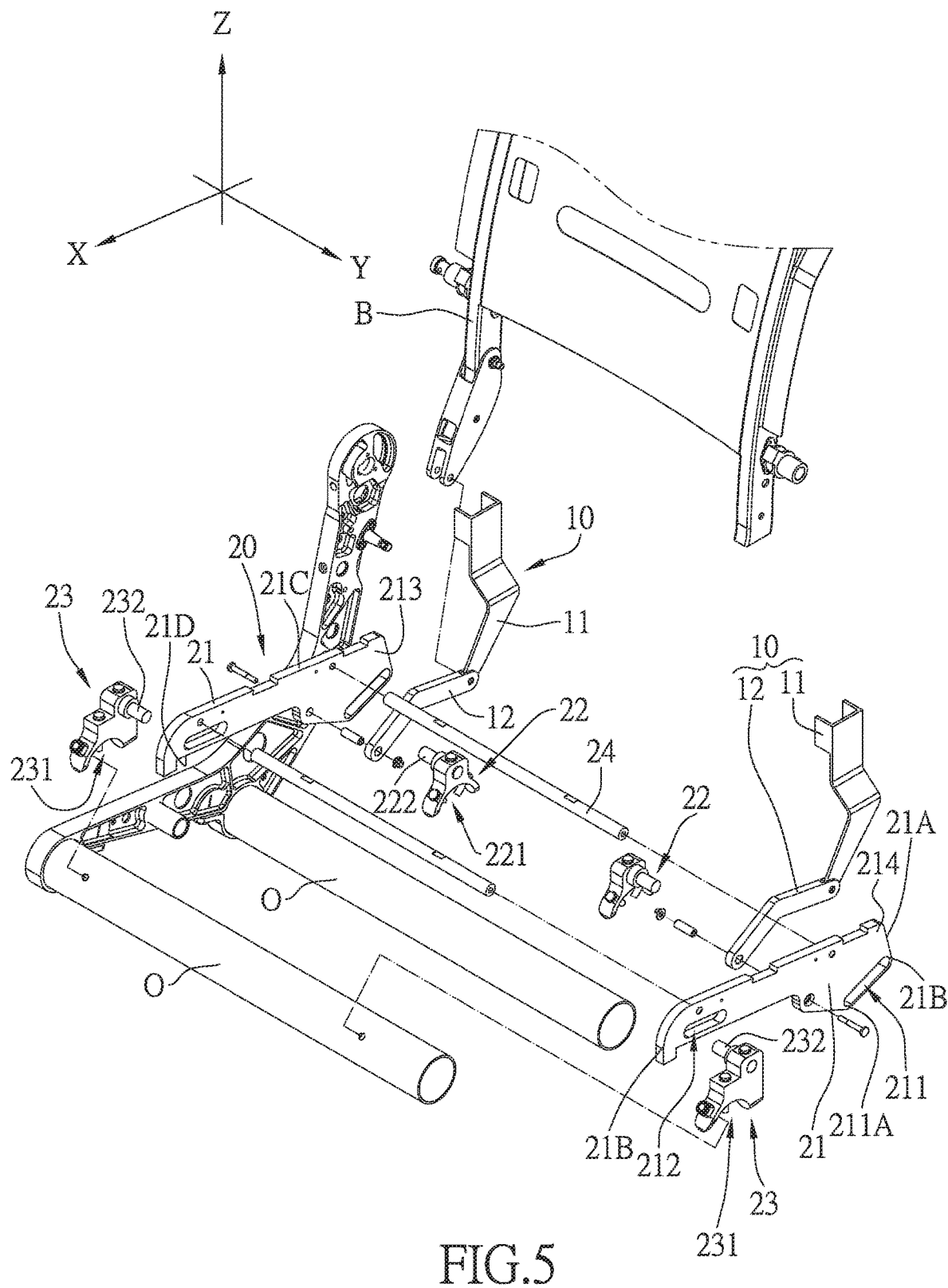
FIG. 5 is an exploded view of the seatback-seat linkage mechanism in accordance with the present invention.

The present invention will be clearer from the following description when viewed together with the accompanying drawings, which show, for purpose of illustrations only, the preferred embodiment in accordance with the present invention.

The invention provides a seatback-seat linkage mechanism which is used in combination with a seatback B and arranged on two seat pipes O, and the seatback-seat linkage mechanism, as shown in FIGS. 4-7, comprises: two connecting rod assemblies 10 and a seat 20.

The connecting rod assemblies 10 are connected to the seatback B and can tilt along a tilt angle of the seatback B. Each of the connecting rod assemblies 10 includes a first connecting member 11 and a second connecting member 12 which extend in different directions, so as to form an angle between the first and second connecting members 11, 12. The first connecting member 11 has a first end connected to the seatback B and a second end pivotally connected to a first end of the second connecting member 12.

The seat 20 is movably disposed on the two seat pipes O, and the connecting rod assemblies 10 are connected to the seat 20. In this embodiment, (for easy explanation, only one connecting rod assembly 10 is illustrated hereafter) a second end of the second connecting member 12 is connected to the seat 20. The seat 20 includes two seat supports 21, two rear pin support assemblies 22 and two front pin support assemblies 23. Each of the seat supports 21 includes a first end 21A, a second end 21B, a top surface 21C and a bottom surface 21D. A direction extending from the first end 21A to the second end 21B is defined as a longitudinal direction X. The two seat supports 21 are parallel to each other and extend along a transverse direction Y perpendicular to the longitudinal direction X. A direction extending from the top surface 21C to the bottom surface 21D is defined as a height direction Z which is perpendicular both to the longitudinal direction X and the transverse direction Y. Each of the seat supports 21 is provided with a first slide slot 211 and a second slide slot 212 which is located closer to the second end 21B than the first slide slot 211, and the first slide slot 211 is located closer to the first end 21A than the second slide slot 212. A direction in which the first slide slot 211 extends has both components in the longitudinal direction X and the height direction Z. The first slide slot 211 includes a first slot end 211A and a second slot end 211B which are located in different positions along the height direction Z, and the first slot end 211A is located closer to the seat pipe O (for easy explanation, only one seat pipe O is illustrated here) than the second slot end 211B in the height direction Z. A direction in which the second slide slot 212 extends has both components in the longitudinal direction X and the height direction Z. However, in a preferred embodiment, the ratio of the extending direction of the first slide slot 211 in the longitudinal direction X to that in the height direction Z is close to 1:1, and the component of the extending direction of the second slide slot 212 in the height direction Z is close to zero.

Each of the two rear pin support assemblies 22 is disposed on one side of a corresponding one of the two seat supports 21, located adjacent to the first slide slot 211 of the corresponding one of the two seat supports 21, and includes a first groove portion 221 and a first pin portion 222. The first groove portion 221 is located toward and formed corresponding to the shape of the outer surface of the seat pipe O, so that the seat pipe O can be engaged in the first groove portion 221. The first pin portion 222 extends in the transverse direction Y into the first slide slot 211. In this embodiment, the two seat supports 21 have mutually facing sides which are defined as an inner side 213 of each of the two seat supports 21, another side of each of the two seat supports 21 opposite to inner side 213 is defined as an outer side 214, and the rear pin support assemblies 22 are disposed on the inner sides 213 of the two seat supports 21.

Each of the two front pin support assemblies 23 is disposed on one side of a corresponding one of the two seat supports 21, located adjacent to the second slide slot 212 of the corresponding one of the two seat supports 21, and includes a second groove portion 231 and a second pin portion 232. The second groove portion 231 is located toward and formed corresponding to the shape of the outer surface of the seat pipe O, so that the seat pipe O can be engaged in the second groove portion 231. The second pin portion 232 extends in the transverse direction Y into the second slide slot 212. In this embodiment, the front pin support assemblies 23 are disposed on the outer sides 214 of the two seat supports 21.

In this embodiment, each of the connecting rod assemblies 10 is connected between the first and second slide slots 211, 212.

In a preferred embodiment, the invention further includes at least one connecting rod 24 which is disposed between the two seat supports 21 and extends in the transverse direction Y. There are two said connecting rods 24 in this embodiment, and the connecting rods 24 are used to improve the structure strength of the seat 20.

A distance between the first and second pin portions 222, 232 is defined as a first distance D1 which ranges from 21 to 23 cm, and is preferably 22.6 cm.

Figure 6:
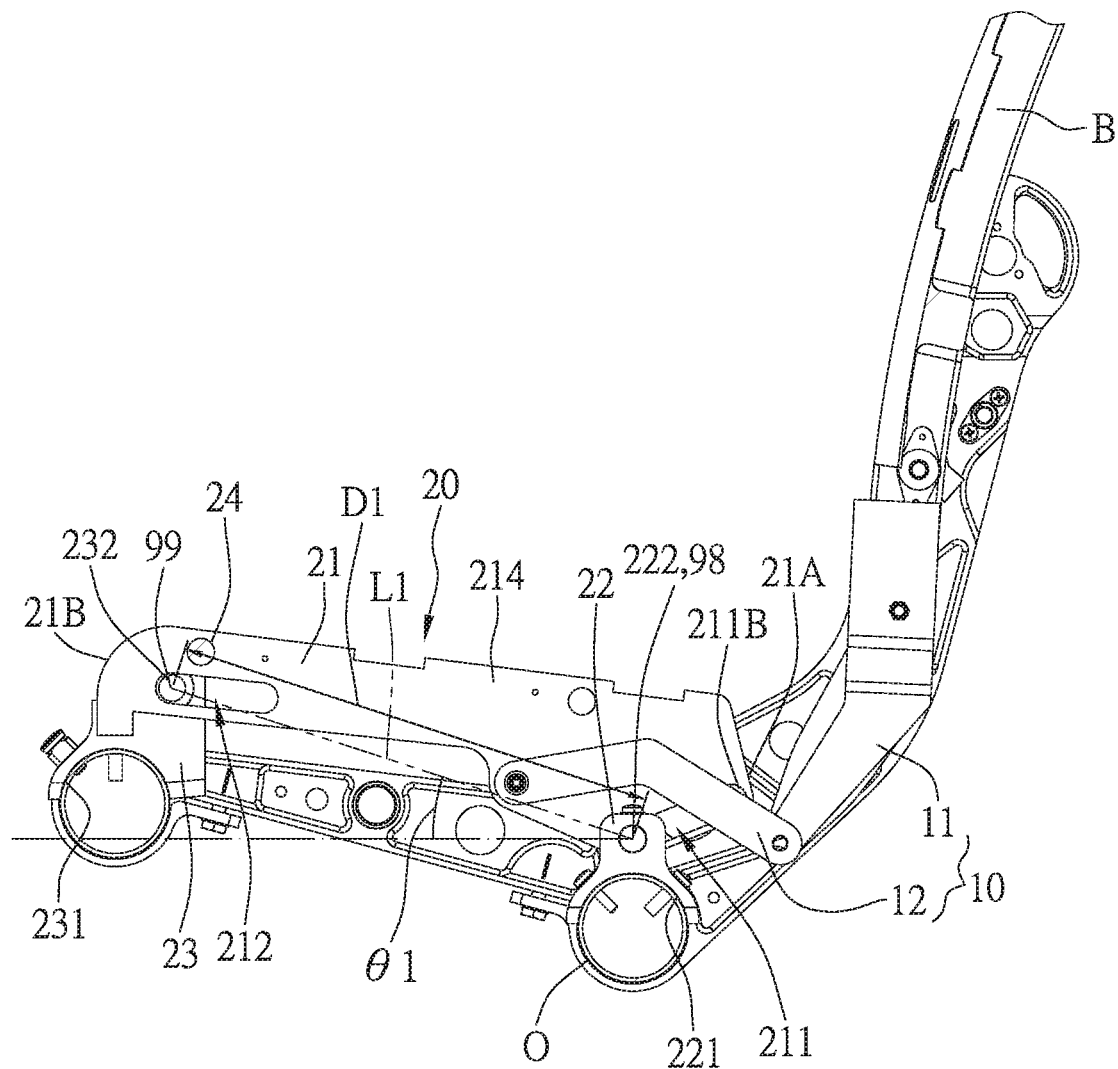
FIG. 6 is a side view showing that the seatback-seat linkage mechanism in accordance with the present invention is in the original position.
Figure 7:
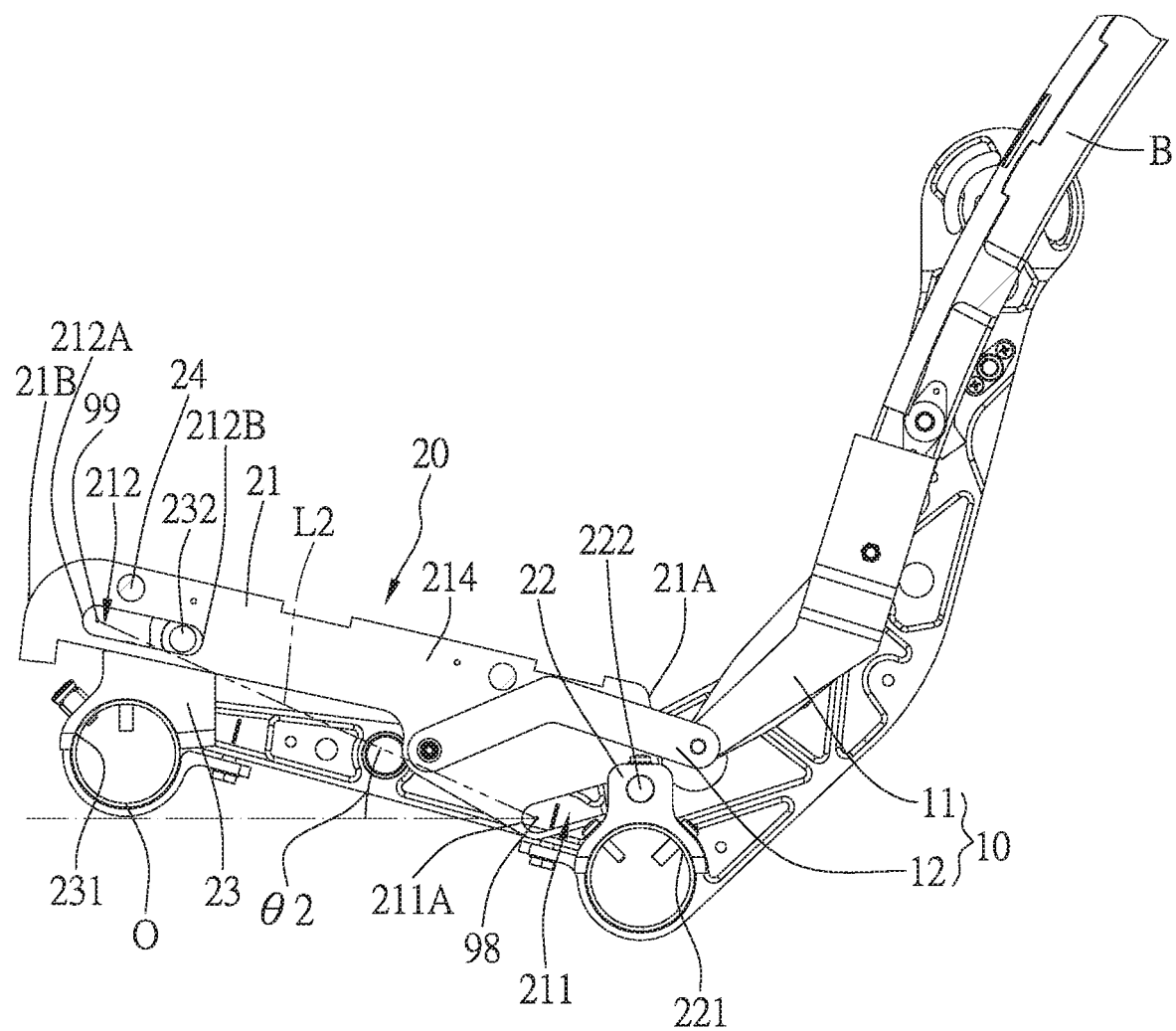
FIG. 7 is a side view showing that the seatback-seat linkage mechanism in accordance with the present invention is in the after-adjustment position.

In a preferred embodiment, as shown in FIG. 7, suppose that the second slide slot 212 includes a third slot end 212A and an opposite fourth slot end 212B which is located closer to the first slide slot 211 than the third slot end 212A in the longitudinal direction X. As shown in FIG. 7, when the first pin portion 222 is abutted against the second slot end 211B, and the second pin portion 232 is abutted against the fourth slot end 212B, the seatback B and the seat 20 are in an after-adjustment position (such as an tilted position). As shown in FIG. 6, when the first pin portion 222 is abutted against the first slot end 211A, and the second pin portion 232 is abutted against the third slot end 212A, the seatback B and the seat 20 are in the original position. The first slide slot 211 has a first center point 98 adjacent to the first slot end 211A, and the second slide slot 212 has a third center point 99 adjacent to the third slot end 212A. The first and third center points 98, 99 are further explained as follows. The first slide slot 211 and the second slide slot 212 in this embodiment are both elliptical slots, and therefore each include two arc portions and one elongated portion which has two ends connected to the two arc portions. The first slot end 211A and the second slot end 211B are located at the two arc portions of the first slide slot 211, respectively, and the third slot end 212A and the fourth slot end 213B are located at the two arc portions of the second slide slot 212, respectively. Each of the two arc portions includes a center point, the first center point 98 is the center point of the arc portion of the first slide slot 211 that has the first slide slot end 211A, and the second center point 99 is the center point of the arc portion of the second slide slot 212 that has the third slot end 212A. When in the original position, as shown in FIG. 6, a connecting line between the first center point and the third center point is a first connecting line L1 which defines a first angle θ1 with respect to the longitudinal direction X, when in the after-adjustment position, a connecting line between the first and third center points 98, 99 is a second connecting line L2 which defines a second angle θ2 with respect to the longitudinal direction X, and the first angle θ1 is smaller than the second angle θ2. In this embodiment, the first angle θ1 ranges from 17.3 to 19.1 degrees, and preferably 18.2. The second angle θ2 ranges from 22.5 to 24.9 degrees, and preferably 23.7 degrees.

What mentioned above is the specific structural configuration of the seatback-seat linkage mechanism of the present invention, and the operation of the invention is described as follows.

As shown in FIGS. 6 and 7, for easy explanation, a direction towards the first end 21A of the seat support 21 relative to the second end 21B is defined a frontward (forward) direction, and the direction towards the second end 21B with respect to the first end 21A is defined as a rearward (backward) direction.

First of all, when a user controls the seatback B to tilt backward, the first connecting member 11 of the connecting rod assembly 10 will also tilt backward along with the seatback B. The second end of the first connecting member 11 that is connected to the first end of the second connecting member 12 will push the second connecting member 12 to move forward, and the seat support 21 will also be pushed to move forward due to the fact that the second end of the second connecting member 12 is connected to the seat support 21 (for easy explanation, only one seat support 21 is illustrated).

In addition, since the first pin portion 222 is inserted in the first slide slot 211, and the second pin portion 232 is inserted in the second slide slot 212, so that the seat supports 21 are only allowed to move along the extending direction of the first and second slide slots 211, 212. Furthermore, the ratio of the extending direction of the first slide slot 211 in the longitudinal direction X to that in the height direction Z is close to 1:1, the first slot end 211A is located closer to the seat pipe O than the second slot end 211B in the height direction Z, and the component of the extending direction of the second slide slot 212 in the height direction Z is close to zero, therefore, as shown in FIGS. 6 and 7, when the first end 21A of the seat support 21 is moving, its downward displacement is relatively large, and when the second end 21B is moving, its upward displacement is relatively small, so as to meet ergonomic requirements.

It can be seen from the above description that the seatback-seat linkage mechanism of the invention is essentially provided with the two seat supports 21, each of which is provided with the first slide slot 211 and the second slide slot 212.

The rear and front pin support assemblies 22, 23 are stably mounted on the seat pipes O in such a manner that the first pin portion 222 of each of the rear pin support assemblies 22 is inserted in the first slide slot 211, the second pin portion 232 of each of the front pin assemblies 23 is inserted in the second slide slot 212, so that, when the connecting rod assemblies 10 drive the seat 20 to move, the seat 20 is able to reciprocate stably along the extending directions of the first and second slide slots 211, 212.

It is worth mentioning that, by limiting the first and second angles θ1, θ2, and the distance between the first and second pin portions 222, 232, the invention can restrict the angular displacement of the seat 20 so as to make the user feel more comfortable, which is an ergonomic design.

While we have shown and described various embodiments in accordance with the present invention, it is clear to those skilled in the art that further embodiments may be made without departing from the scope of the present invention.

What is claimed is:

1. A seatback-seat linkage mechanism being provided for use in combination with a seatback and arranged on two seat pipes, the seatback-seat linkage mechanism comprising:
    a plurality of connecting rod assemblies connected to the seatback;
    a seat movably disposed on the two seat pipes, wherein the connecting rod assemblies are connected to the seat, the seat includes two seat supports, two rear pin support assemblies and two front pin support assemblies, each of the seat supports includes a first end and a second end, each of the seat supports is provided with a first slide slot and a second slide slot which is located closer to the second end than the first slide slot, and the first slide slot is located closer to the first end than the second slide slot;
    each of the two rear pin support assemblies is disposed on one side of a corresponding one of the two seat supports, located adjacent to the first slide slot of the corresponding one of the two seat supports, and includes a first groove portion and a first pin portion, the first groove portions are provided for engaging with the seat pipes, the first pin portions are inserted into the first slide slots;
    each of the two front pin support assemblies is disposed on the one side of the corresponding one of the two seat supports, located adjacent to the second slide slot of the corresponding one of the two seat supports, and includes a second groove portion and a second pin portion, the second groove portions are provided for engaging with the seat pipes, and the second pin portions are inserted into the second slide slots.

2. The seatback-seat linkage mechanism as claimed in claim 1, wherein each of the connecting rod assemblies includes a first connecting member and a second connecting member which extend in different directions, so as to form an angle between the first and second connecting members, the first connecting member has a first end connected to the seatback and a second end pivotally connected to a first end of the second connecting member, and a second end of the second connecting member is connected to the seat.

3. The seatback-seat linkage mechanism as claimed in claim 1, wherein each of the seat supports includes a top surface and a bottom surface, a direction extending from the top surface to the bottom surface is defined as a height direction, the first slide slot includes a first slot end and a second slot end which are located in different positions along the height direction, and the first slot end is located closer to the seat pipes than the second slot end in the height direction.

4. The seatback-seat linkage mechanism as claimed in claim 3, wherein a direction extending from the first end to the second end is defined as a longitudinal direction, the second slide slot includes a third slot end and an opposite fourth slot end which is located closer to the first slide slot than the third slot end in the longitudinal direction, when the first pin portion is abutted against the second slot end, and the second pin portion is abutted against the fourth slot end, the seatback is in an after-adjustment position, when the first pin portion is abutted against the first slot end, and the second pin portion is abutted against the third slot end, the seatback is in an original position, the first slide slot has a first center point adjacent to the first slot end, the second slide slot has a third center point adjacent to the third slot end, when in the original position, a connecting line between the first center point and the third center point is a first connecting line which defines a first angle with respect to the longitudinal direction, when in the after-adjustment position, a connecting line between the first and third center points is a second connecting line which defines a second angle with respect to the longitudinal direction, the second angle is larger than the first angle, the first angle ranges from 17.3 to 19.1 degrees, and the second angle ranges from 22.5 to 24.9 degrees.

5. The seatback-seat linkage mechanism as claimed in claim 1, wherein a direction extending from the first end to the second end is defined as a longitudinal direction, the two seat supports are parallel to each other and extend along a transverse direction perpendicular to the longitudinal direction, a height direction is perpendicular both to the longitudinal direction and the transverse direction, a direction in which the first slide slot extends has both components in the longitudinal direction and the height direction, a direction in which the second slide slot extends has both components in the longitudinal direction and the height direction, and the first and second pin portions extend in the transverse direction.

6. The seatback-seat linkage mechanism as claimed in claim 5, wherein a component of an extending direction of the second slide slot in the height direction is close to zero.

7. The seatback-seat linkage mechanism as claimed in claim 1, wherein the two seat supports have mutually facing sides which are defined as an inner side of each of the two seat supports, another side of each of the two seat supports opposite to the inner side is defined as an outer side, the front pin support assemblies are disposed on the outer sides of the two seat supports, and the rear pin support assemblies are disposed on the inner sides of the two seat supports.

8. The seatback-seat linkage mechanism as claimed in claim 1, wherein each of the connecting rod assemblies is connected between the first and second slide slots.

9. The seatback-seat linkage mechanism as claimed in claim 1 further comprising at least one connecting rod which is disposed between the two seat supports.

10. The seatback-seat linkage mechanism as claimed in claim 1, wherein a distance between the first and second pin portions is defined as a first distance which ranges from 21 to 23 cm.

* * * * *